Sept. 22, 1959  H. C. MAY  2,905,507
BRAKE VALVE DEVICE
Filed May 29, 1956  3 Sheets-Sheet 1

INVENTOR.
Harry C. May
BY
Adelbert A. Steinmiller
ATTORNEY

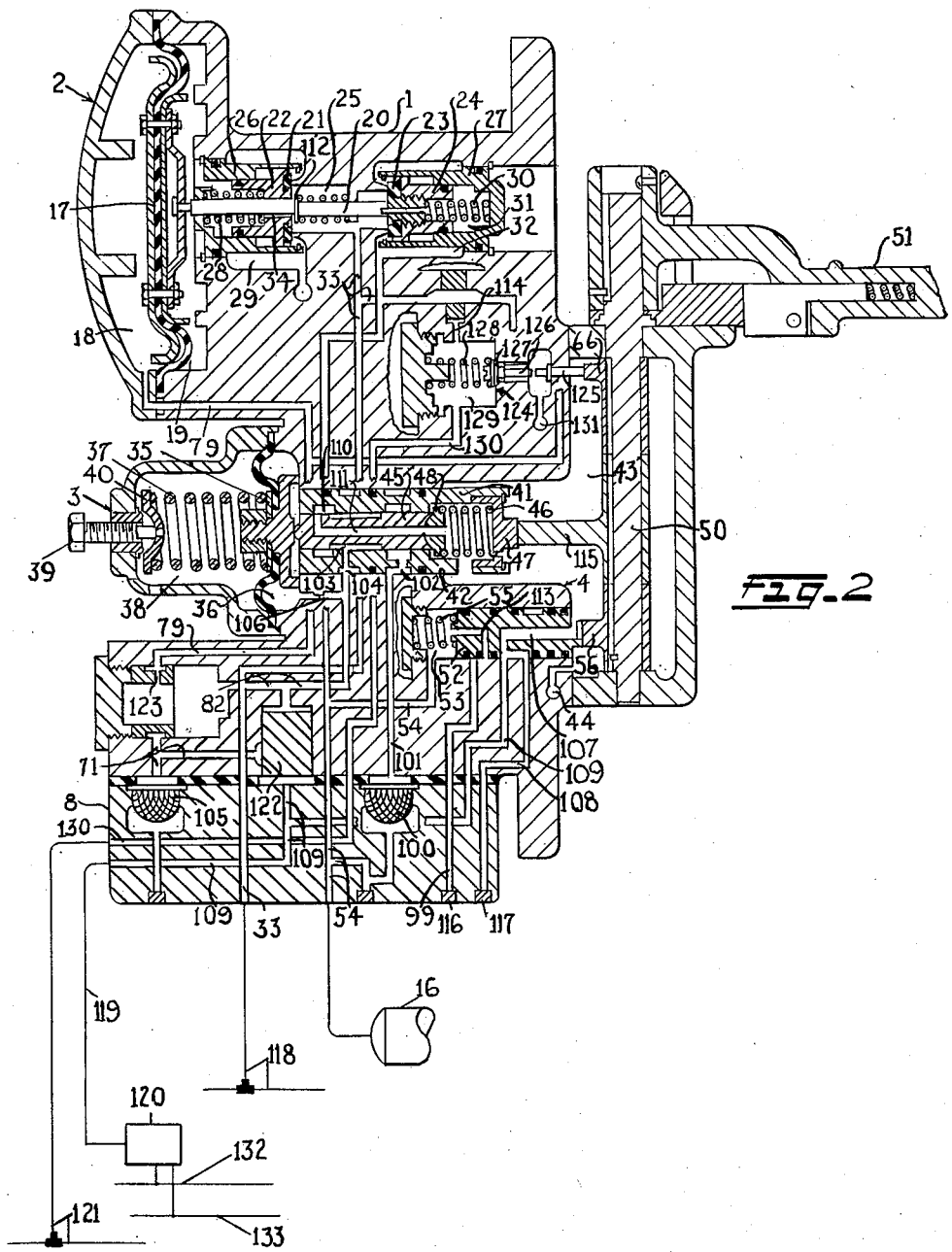

Sept. 22, 1959           H. C. MAY           2,905,507

BRAKE VALVE DEVICE

Filed May 29, 1956           3 Sheets—Sheet 3

INVENTOR.
HARRY C. MAY
BY
ATTORNEY

United States Patent Office 2,905,507
Patented Sept. 22, 1959

2,905,507

BRAKE VALVE DEVICE

Harry C. May, East McKeesport, Pa., assignor to Westinghouse Air Brake Company, Wilmerding, Pa., a corporation of Pennsylvania Application May 29, 1956, Serial No. 588,036

10 Claims. (Cl. 303—50)

This invention relates to locomotive fluid pressure brake apparatus and more particularly to such apparatus embodying an improved self-lapping type brake valve device which may be conditioned to provide either automatic or straight air control of brakes on a locomotive and connected cars of a train.

It has heretofore been proposed to provide, for use on railway cars, a brake controlling valve device adapted to provide graduated or direct release of an automatic brake application on such cars according to whether brake pipe pressure is restored at a relatively slow rate or at a relatively fast rate, respectively, as controlled at the locomotive by the operator.

One object of this invention is to provide a locomotive brake apparatus embodying a brake valve device which, when conditioned for automatic operation, may be operated to control the rate of restoration of brake pipe pressure at a relatively slow rate and within small increments or at a relatively fast rate for thereby causing brake controlling valve devices of the type just described to pneumatically effect a graduated or a direct release, respectively, of an automatic application of brakes on corresponding cars of a train.

Another object is to provide a locomotive brake apparatus embodying a brake valve device, which, when conditioned for straight air operation, is adapted to provide pneumatic straight air control of brakes according to the pressure of fluid pneumatically supplied by said brake valve device to a straight air pipe.

Another object is to provide a locomotive brake apparatus embodying a brake valve device operative in a fast release position to condition electro-pneumatic means for electro-pneumatically effecting a direct release of a straight air application of brakes on the locomotive and connected cars and operative in an application zone to pneumatically effect a graduated release of said straight air application.

Another object is to provide a brake valve device embodying three cams rotatably carried by a common shaft for controlling, according to positioning of a brake valve handle, the operation of a self-lapping control valve device, a vent valve device and a suppression control valve device, respectively.

Other objects and advantages will become apparent from the following more detailed description of the invention and from the accompanying drawings, wherein:

Fig. 2 is a diagrammatic view of a brake valve device substantially identical with that shown in Fig. 1 and shown associated with other components of a locomotive brake apparatus; said brake valve device being conditioned to control brakes on the locomotive and connected cars on the straight air principle;

Figure 1:
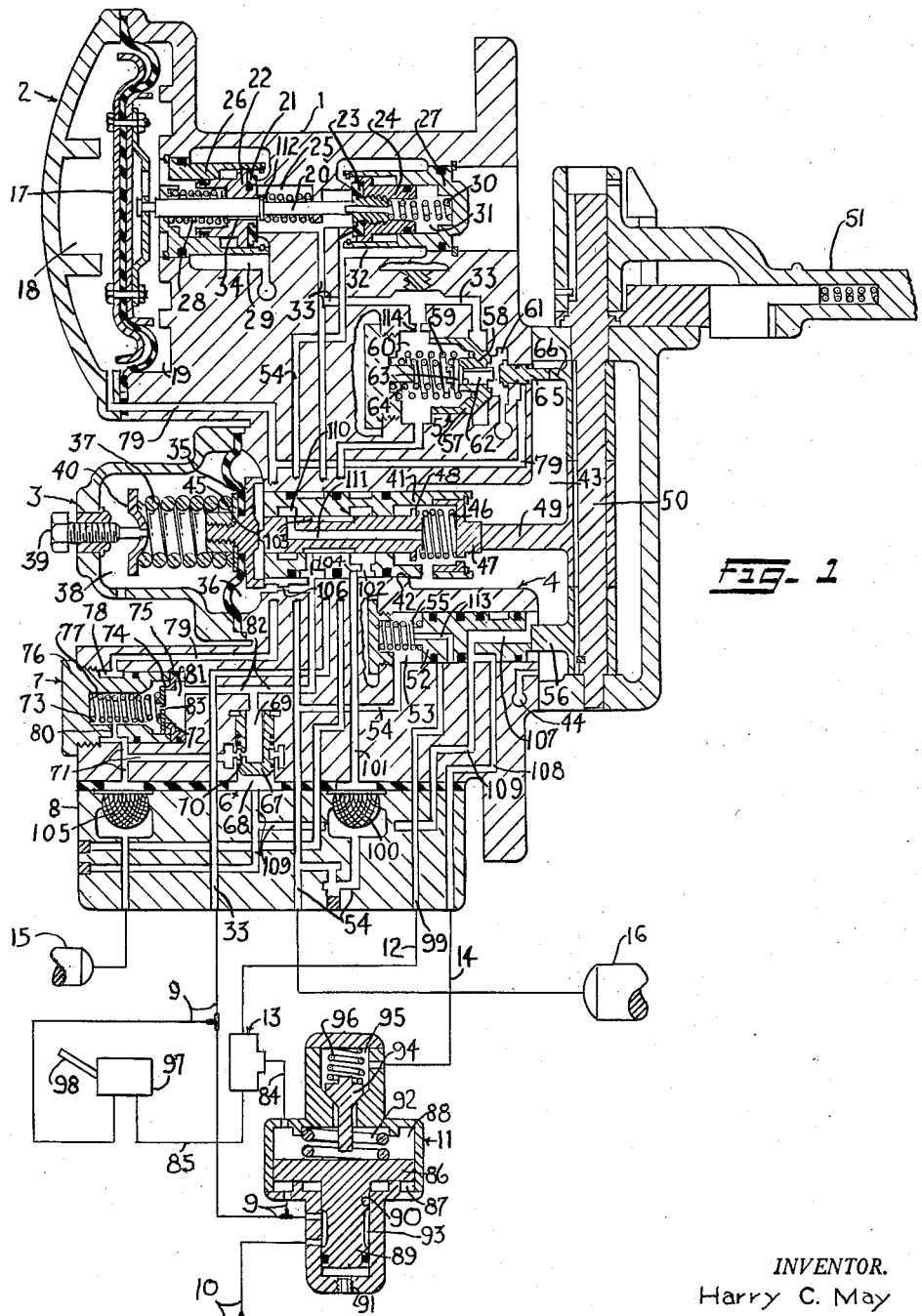
Fig. 1 is a diagrammatic view of a brake valve device embodying the invention, shown in the association with other components of a locomotive brake apparatus, and conditional to control brakes on the locomotive and connected cars on the automatic principle.

Fig. 3 is a diagrammatic development view showing port connections and pressure conditions established in various positions of the handle of the brake valve device, when conditioned for automatic operation; and Fig. 4 is a diagrammatic development view showing port connections and pressure conditions established in various positions of the handle of the brake valve device when conditioned for straight air operation.

*Description—Fig. 1*

As shown in this figure, the brake valve device embodying the invention comprises a sectionalized casing 1 containing a relay valve device 2, a self-lapping control valve device 3, a suppression control valve device 4, an emergency or vent valve device 5, a quick release valve device 6, and a check valve and choke device 7. The casing 1 is mounted on a pipe bracket 8, to which are connected a pipe 9 normally connected to a branch of the usual brake pipe 10 via an application valve device 11; a permanent suppression pipe 12 leading to one end of a double check valve device 13; a lockover pipe 14 leading to valve device 11; a pipe leading to an equalizing reservoir 15; and a pipe leading to a main reservoir 16.

The relay valve device 2 comprises a diaphragm piston 17, which is subject to opposing fluid pressures in a chamber 18 and a chamber 19 and is adapted through the medium of a coaxially arranged operating stem 20 to effect unseating of a preferably disc-shaped exhaust valve 21 carried by a valve member 22 or effect unseating of a preferably disc-shaped supply valve 23 carried by coaxially arranged valve member 24, according as the pressure in chamber 18 is less than or exceeds the pressure in chamber 19. The stem 20, which is coaxially connected to the piston 17 at the side thereof adjacent chamber 19, projects centrally through valve member 22 and through a chamber 25 and is adapted to abuttingly engage one end of supply valve member 24. The members 22, 24 are slidable within bushings 26, 27, respectively, suitably retained in the casing. A helical spring 28 encircling stem 20 and arranged in chamber 19 between the bushing 26 and valve member 22 urges said member 22 to a position for seating the exhaust valve 21 against a tapered annular valve seat rib encircling one end of chamber 25, for thereby preventing release flow of fluid under pressure from chamber 25 to an atmospheric chamber 29. A helical spring 30 arranged in a chamber 31 and interposed between bushing 27 and the valve member 24 urges the latter to a position for seating the supply valve 23 against a tapered annular valve seat rib encircling the opposite end of chamber 25, for thereby preventing flow of fluid under pressure from a chamber 32 to chamber 25; the chamber 31 being constantly open to the chamber 25 so that pressure in the latter chamber will not effect undesired seating of the valve 23. Chamber 25 is constantly open via a passage 33 to the pipe 9; and said chamber 25 is also constantly open to chamber 19 by way of a groove or clearance 34 between the stem 20 and valve member 22.

The self-lapping control valve device 3 comprises a diaphragm piston 35 subject at one side to pressure of fluid in a chamber 36 and at the opposite side to pressure of a helical spring 37 in an atmospheric chamber 38; the degree of compression of said spring being manually adjustable from outside the casing by means of an adjusting screw 39 which adjusts position of a spring retainer 40 so as to preload the diaphragm piston 35 to a desired degree corresponding to the desired normal full charge value of equalizing reservoir pressure and hence of brake pipe pressure.

A main cylindrical slide valve 41 is coaxially arranged with the diaphragm piston 35 and sealingly slidable in a bore 42 formed in the casing and open at one end to chamber 36 and at the opposite end to a chamber 43 that is open to atmosphere via a vent port 44. An auxiliary slide valve 45 is telescopingly slidable within a coaxially arranged bore through the valve 41. A helical spring 46 is contained in chamber 43 and interposed between a follower member 47, that is rigidly secured to valve 41 by a retaining ring, and a collar 48 encircling one end of valve 45, for urging a projection formed on the opposite end of the latter valve toward contact with the central part of the piston 35. The follower 47 is engaged by a cam 49 rotatably carried by a stem 50 disposed at right angles to said cam; said stem being rotatably secured to a manually operable handle 51, whereby positioning of the valve 41 may be precisely controlled.

The suppression control valve device 4 comprises a cylindrical valve 52 sealingly slidable in a bore in the casing and subject at one end to pressure of fluid in a chamber 53 open via a passage 54 to the main reservoir 16 and also to pressure of a helical bias spring 55 in said chamber; these pressures urge the valve 52 into contact at its opposite end with a cam 56 that is also rotatably carried by stem 50 in spaced relation to the cam 49, so that positioning of valve 52 may likewise be controlled by handle 51.

The emergency valve device 5 comprises a generally cylindrical valve member 57 having at one end a tapered vent valve 58 normally seated against a tapered annular valve seat by pressure of a helical bias spring 59 in a chamber 60 for preventing release flow of brake pipe pressure from a branch of passage 33 to an atmospheric chamber 61. The valve member 57 has a coaxially arranged through bore in which is slidably mounted a fluted stem 62 of a pilot valve 63 that is disposed in chamber 60 and normally seated by pressure of a helical bias spring 64 in said chamber. The fluted stem 62 projects into chamber 61 and is adapted to be engaged by one end of a coaxially arranged pusher stem 65, the opposite end of which is engageable by a cam 66 rotatably carried by brake valve stem 50 in spaced relation to the cams 49 and 56.

The quick release valve device 6 comprises a hollow cylindrical valve member 67 closed at one end and subject to opposingly fluid pressures in chambers 68, 69. The valve member 67 controls a restricted communication, including a restricted radial port 70, between chamber 69 and a passage 71 leading to the equalizing reservoir 15; said valve member 67 being shiftable reversely to open or close said communication according to whether fluid pressure in chamber 68 is greater or less than pressure in chamber 69.

The check valve and choke device 7 comprises a preferably disc-shaped check valve 72 urged by a helical bias spring 73 into seating contact with a tapered annular valve seat 74 formed on an annular valve seat member 75; the latter being sealingly positioned in the casing by a projecting sleeve portion of a sleeved nut 76 that is threaded into the casing and has a recess 77 in which said spring 73 is disposed. This sleeve portion has an annular cavity 78 which connects a branch of passage 71 with a passage 79 leading to chamber 18 of relay valve device 2. The cavity 78 is also open via a restricted radial port 80 to the recess 77, such that pressure in said recess is normally the same as that in passage 71. The check valve 72 prevents fluid flow from the recess 77 to a chamber 81 that is constantly open via a passage 82 to chamber 69 of device 6, but permits substantially unrestricted flow in the reverse direction. The check valve 72 has a coaxially arranged choke 83 for permitting flow at a restricted rate between recess 77 and chamber 81.

The double check valve device 13 may be of any well-known type comprising means (not shown) operative to connect a pipe 84 to either the suppression pipe 12 or a pipe 85 according to whichever one of the pipes 12 or 85 is charged with fluid at the preponderant pressure.

The application valve device 11 may, for sake of illustration, comprise a piston 86 slidably mounted in a sectionalized casing and having at one side a chamber 87 constantly open to the pipe 9 and at the opposite side a chamber 88 open to the pipe 84. Preferably formed integrally with the piston 86 is a cylindrical slide valve 89 having sealing, slidably guided contact with the wall of a bore 90 open at one end to chamber 87 and open at the opposite end to atmosphere via a choke 91. A helical bias spring 92 in chamber 88 biases the piston 86 and thereby the valve 89 to a normal position, in which it is shown, and in which an elongated annular cavity 93 in said valve connects a branch of pipe 9 to the aforementioned branch of brake pipe 10. A tapered poppet valve 94 is arranged coaxially with the piston 86 and contained in a chamber 95 constantly open to the lockover pipe 14. This valve 94 is biased to a closed position by a helical spring 96 in chamber 95, for normally preventing flow between chamber 95 and chamber 88. Valve 94 has a coaxially arranged stem which extends with radial clearance through a casing partition separating the chambers 88, 95 and projects into chamber 88 such that said stem may be abuttingly engaged by the piston 86 for operatively unseating valve 94.

Pipe 85 is a pipe which must be maintained charged (except when permanent suppression pipe 12 is charged) in order to prevent a safety control or train control application of brakes. Although this pipe 85 may be vented upon the occurrence of any one of a number of conditions well known in the art, this pipe is, for purposes of simplified illustration, shown associated with a foot valve device 97, known as a "dead man control valve device," which may be of the type shown in U.S. Patent 1,895,476, granted January 31, 1933, and assigned to the assignee of the present invention. This device 97 comprises valve means (not shown) operative so long as a pedal 98 is depressed, to maintain pipe 85 charged with fluid under pressure from a source, such as a branch of pipe 9; said valve means being operative when foot pressure is removed from said pedal, to disconnect pipe 85 from said source and open pipe 85 to atmosphere, for causing a safety control application of brakes in the manner hereinafter described.

*Operation—Fig. 1*

With the apparatus devoid of fluid under pressure and the brake valve handle 51 in slow release position (Fig. 3), the various components will assume the respective positions in which they are shown in Fig. 1 of the drawing.

To initially charge the equipment, the main reservoir 16 is charged with fluid under pressure in the usual manner. With the brake valve handle 51 in slow release position, a passage 99 connecting permanent suppression pipe 12 with the seat of suppression control valve 52 is lapped by the latter valve; and hence the foot valve pedal 98 should be depressed to connect pipes 9 and 85 so that fluid under pressure may be supplied, in the manner hereinafter described, via pipe 85 and double check valve device 13 to pipe 84 and chamber 88 of application valve device 11 for maintaining the application slide valve 89 in normal position, in which it is shown.

Meanwhile, main reservoir fluid will flow via a branch of passage 54 through a strainer 100 to a passage 101 and thence via a port 102 in main slide valve 41 to an elongated annular cavity 103 in auxiliary slide valve 45 and thence via a port 104 in said main slide valve of control valve device 3 to a branch of passage 82. Some of the fluid thus supplied to passage 82 will flow to chamber 69 for shifting the quick release valve member 67 to a cut-off position, if not already there, for closing off flow from chamber 69 to passage 71 via restricted port 70. Fluid will also flow from passage 82 to chamber 81 and unseat check valve 72 against resistance of spring 73 and then flow past said check valve and through recess 77, restricted port 80, and cavity 78 to passage 71, whence it will flow via a strainer 105 to the equalizing reservoir 15 for charging the latter.

Meanwhile, fluid will also flow from recess 77 via restricted port 80 and cavity 78 to passage 79 and thence to chamber 18 of relay valve device 2, causing the diaphragm piston 17 to shift rightward and, through the medium of the stem 20, unseat the supply valve 23 against resistance of spring 30. With supply valve 23 unseated, main reservoir fluid will flow via a branch of passage 54 and the chamber 32 to chamber 25. From chamber 25 such fluid will flow via passage 33 and pipe 9 to foot valve device 97, which with pedal 98 depressed will supply such fluid to pipe 85 for supply via double check valve device 13 to pipe 84 and chamber 88 for maintaining the valve 89 in its normal position, in which it is shown, and in which it connects a branch of pipe 9 to the brake pipe 10 via cavity 93 for permitting the brake pipe to be charged with fluid under pressure from pipe 9.

Meanwhile, as fluid under pressure is supplied via the control valve device 3 to passage 82 for charging the equalizing reservoir 15, as above described, some of such fluid will flow via a branch of passage 82 and a baffle choke 106 to chamber 36 of said device 3. When pressure in chamber 36 is sufficient to slightly overcome the resistance of spring 37 (which resistance was prejusted according to the desired full charge value of equalizing reservoir pressure and hence of brake pipe pressure), the diaphragm piston 35 will be shifted leftward and cause the spring 46 to shift the valve 45 leftward a corresponding distance relative to the then stationary valve 41, such that the valve 45 is maintained in contact with said piston. As a result of this shifting of valve 45, the control valve device 3 will be in a lap position, in which cavity 103 in valve 45 is out of registry with port 102 in valve 41, for thereby terminating supply of main reservoir fluid via passage 82 to the equalizing reservoir 15 and to the chamber 18 of relay valve device 2.

Meanwhile, as main reservoir fluid is supplied past the unseated supply valve 23 to chamber 25 for supply to the pipe 9, as above described, some of such fluid will flow from chamber 25 through the clearance space 34 to chamber 19 of device 2. When pressure in chamber 19 is substantially equal to equalizing reservoir pressure, as noted in chamber 18, the diaphragm piston 17 and hence stem 20 will be shifted leftward and permit supply valve 23 to be seated by spring 30 for terminating supply of main reservoir fluid to the chamber 25 and hence to the brake pipe 10 via communication previously traced.

Meanwhile, the suppression control valve device 4 will be maintained by cam 56 in the position in which it is shown. In this position, an opening 107 provided in valve 52 and constantly connected to atmospheric chamber 43 registers with a passage 108 leading to the lockover pipe 14 and also registers with a passage 109 leading to chamber 68 of quick release valve device 6, for maintaining pipe 14 and chamber 68 vented to atmosphere.

To effect a service application of brakes, the brake valve handle 51 is moved into an application zone, defined between slow release position and a service position (Fig. 3), a degree corresponding to the degree of service application desired, for thereby reducing the thrust of cam 49 and causing spring 46, through the medium of follower 47, to shift the main slide valve 41 of control valve device 3 rightward relative to the auxiliary slide valve 45, which is then held stationary by contact with the diaphragm piston 35 under action of spring 46. Under this condition, an elongated annular cavity 110 in main slide valve 41 will connect cavity 103 with an opening 111 in auxiliary slide valve 45, which opening is constantly connected to atmospheric chamber 43; cavity 103 then being in registry with port 104 and passage 82. Hence, fluid under pressure will be released from the equalizing reservoir 15 to atmosphere at a service rate by flow through passage 71, cavity 78, restricted port 80, recess 77, service choke 83 in check valve 72, chamber 81, passage 82, port 104, cavity 103, cavity 110, opening 111 and atmospheric chamber 43.

Thus, equalizing reservoir pressure and hence pressure in chamber 36 of control valve device 3 will reduce at the service rate controlled by choke 83 (which is of smaller flow capacity than restricted port 80) to a chosen degree corresponding to the position of cam 49, which in turn is controlled according to the positioning of the brake valve handle 51 in the application zone. By the time equalizing reservoir pressure, as noted in chamber 36, has reduced said chosen degree, the diaphragm piston 35 will have been shifted rightward sufficiently to shift the auxiliary slide valve 45 rightward relative to the then stationary main slide valve 41 to a position in which cavity 103 is out of registry with cavity 110; whereupon fluid in the equalizing reservoir 15 and chamber 36 will be bottled up at the desired reduced pressure.

Meanwhile, equalizing reservoir pressure as noted in chamber 18 of relay valve device 2 will reduce the aforementioned chosen degree, causing diaphragm piston 17 to be shifted leftward by preponderant brake pipe pressure in chamber 19 and thereby carry stem 20 leftward for causing a collar 112 on said stem to successively engage and then shift valve member 22 leftward against resistance of spring 28 for unseating the exhaust valve 21. With valve 21 unseated, fluid under pressure will be released from the brake pipe 10 via cavity 93 of device 11, pipe 9, passage 33, chamber 25, past unseated valve 21, to atmospheric chamber 29, until fluid is bottled up in the equalizing reservoir 15 at the desired reduced pressure, in the manner above described; whereupon, when brake pipe pressure in chamber 19 is reduced to a slightly greater degree, the piston 17 and hence stem 20 will be shifted rightward for disengaging the collar 112 from valve member 22 and thereby permitting spring 28 to effect reseating of exhaust valve 21 to terminate release of brake pipe pressure.

Thus, brake pipe pressure will be reduced at the same rate as equalizing reservoir pressure is reduced—namely, at a service rate—and to a degree corresponding to the operator-selected reduction in equalizing reservoir pressure (due to the relay action of valve device 2) for causing brakes on the locomotive and connected cars of a train to be controlled automatically according to degree of reduction in brake pipe pressure, in the well-known manner.

If a full service application of brakes is desired, the handle 51 is moved to service position; whereupon the control valve device 3 will operate to effect a reduction of such as 20 p.s.i. in equalizing reservoir pressure, and the relay valve device 2 will operate to effect a corresponding 20 p.s.i. reduction in brake pipe pressure.

With the brake valve handle 51 in the application zone, including service position, the cams 66 and 56 will be so positioned that the vent valve device 5 and suppression control valve device 4, respectively, will be positioned as shown in the drawing and described in connection with initial charging of the equipment.

If a full service application of brakes is desired and it is also desired to effect suppression of a safety control (or train control) application of brakes, the brake valve handle 51 may be moved directly to a suppression position (Fig. 3). With handle 51 in suppression position, the control valve device 3 and relay valve device 2 will operate in the same manner as if the said handle were in service position, as above described; however, the suppression control valve 52 will have been shifted leftward by cam 56 against resistance of spring 55 to a suppression position, in which passage 108 leading to the lockover pipe 14 is lapped and main reservoir fluid is supplied via chamber 53 and an opening 113 in valve 52 to passage 99 for charging the permanent suppression pipe 12. With pipe 12 thus charged, the double check valve device 13 will operate to supply fluid at main reservoir pressure from pipe 12 to pipe 84 and chamber 88 of application valve device 11 for thereby maintaining valve 89 of the latter device in its normal position, as shown, and thereby suppress a safety control application of brakes, even if pipe 85 is vented, such as by virtue of the operator failing to maintain the pedal 98 of foot valve device 97 depressed.

To effect a graduated release of an automatic service application of brakes, the brake valve handle 51 is moved, a degree corresponding to the degree of brake release desired, from suppression position or service position or from the setting of said handle in the aforementioned application zone back toward slow release position. During this movement of handle 51, the cam 49 will be rotated for causing main slide valve 41 of control valve device 3 to be shifted leftward relative to the then stationary auxiliary slide valve 45 a distance corresponding to the degree of release desired; whereupon the equalizing reservoir 15 and chamber 36 of device 3 will be recharged with fluid at a pressure corresponding to the position of said handle, via communication traced during discussion of initial charging. When equalizing reservoir pressure has been restored the desired degree, valve 45 will be shifted leftward by spring 46 to lap position for terminating charging of the equalizing reservoir 15. Meanwhile, the relay valve device 2 will operate to recharge the brake pipe 10 to a pressure substantially equal to the pressure of fluid obtaining in the equalizing reservoir 15, as will be understood from previous description.

Thus, according to a feature of the invention, the self-lapping control valve device 3 is capable, according to positioning of the cam 49 as controlled by the setting of a brake valve handle 51 in the application zone, to control equalizing reservoir pressure within small increments and thereby so control operation of the relay valve device 2 as to correspondingly control brake pipe pressure within the small increments.

If, on the other hand, it is desired to effect a fast, direct release of an automatic application of brakes, the brake valve handle 51 is moved from its setting in the application zone directly to a fast release position (Fig. 3). During movement of handle 51 to this position, the cam 49 will shift the main slide valve 41 leftward the same distance as in slow release position for causing the self-lapping control valve device 3 to operate to restore equalizing reservoir pressure to normal full charge value corresponding to the setting of screw 39; and relay valve device 2 will operate to recharge the brake pipe 10 to the degree to which the equalizing reservoir is recharged. However, during movement of handle 51 to fast release position, cam 56 will be rotated to its lowest point, causing spring 55 to shift the suppression control valve 52 rightward to a position in which opening 113 in said valve registers with passage 109, for causing main reservoir fluid to be supplied via passage 109 to chamber 68 of quick release valve device 6 for shifting valve member 67 to its quick release position, in which it is shown, against resistance of the lesser equalizing reservoir pressure in chamber 69. With valve member 67 in this position, fluid will be supplied to the equalizing reservoir 15 via passage 82, chamber 69 and restricted port 70, as well as via another branch of passage 82 and past check valve 72 and through restricted port 80 to passage 71. Hence, in fast release position of brake valve handle 51, the equalizing reservoir 15 will be recharged at a relatively fast rate corresponding to the combined flow capacities of the restricted ports 70 and 80; whereas in slow release position recharging of the equalizing reservoir will be solely at the rate controlled by the restricted port 80. The relay valve device 2 will respond to rate of increase in equalizing reservoir pressure to effect recharging of the brake pipe 10 at a corresponding rate; and hence with brake valve handle 51 in fast release position, the brake pipe 10 will be recharged at a faster rate than obtained with said handle in slow release position or in the application zone.

Thus, the brake valve device herein described is adapted to control operation of a brake controlling valve device of the type disclosed in the copending application of Robert L. Wilson and Robert J. Worbois, U.S. Serial No. 567,838, filed Feb. 27, 1956, and assigned to the assignee of the present invention; said brake controlling valve device embodying means responsive to charging of the brake pipe at a fast rate, such as obtained with the brake valve handle 51 in fast release position, to effect a direct release of brakes on a railway car, and responsive to charging of the brake pipe at a slower rate, such as obtained in the application zone or slow release position of brake valve handle 51, to effect a graduated release of the brakes on a railway car.

To effect an emergency application of brakes, the brake valve handle 51 is moved to an emergency position (Fig. 3). During this movement, cam 66 will shift the pusher stem 65 leftward into engagement with fluted stem 62 and then, through such engagement, unseat the pilot valve 63 against resistance of spring 64 for opening chamber 60 to atmospheric chamber 61, for reducing the force with which vent valve 58 is biased to its seat; said chamber 60 being open to a branch of brake pipe passage 33 via a choke 114. As pusher stem 65 continues to move leftward, an outwardly directed radial flange thereon will engage the valve member 57 for operatively unseating the vent valve 58 and thereby connecting a branch of brake pipe passage 33 directly to atmospheric chamber 61 for venting the brake pipe 10 at an emergency rate. The pusher stem 65 has a reduced diameter portion adjacent cam 66; and during the above-described leftward movement of said stem, this reduced diameter portion will register with a branch of passage 79 for connecting the latter to atmospheric chamber 43 and thereby venting the equalizing reservoir 15 and chamber 18 of relay valve device 2 directly to atmosphere.

Meanwhile, during movement of brake valve handle 51 to emergency position, cam 49 will be rotated to its lowest point, causing spring 46 acting through the follower 47 to shift the main slide valve 41 rightward relative to the then stationary auxiliary slide valve 45, for causing a complete release of fluid under pressure from the equalizing reservoir 15 via restricted port 80 and service choke 83, to further augment release flow from said reservoir. Venting of fluid from the equalizing reservoir 15 is thus accomplished at a rate equal to or exceeding the rate at which the brake pipe 10 is vented past the unseated vent valve 58, so that if the relay valve device 2 operates, it will operate to unseat the exhaust valve 21, rather than unseat the supply valve 23.

It is to be noted that with brake valve handle 51 in emergency position, the cam 56 will be positioned for causing the suppression control valve 52 to effect the connections described in connection with suppression position, for thereby suppressing a safety control (or train control) application of brakes and also assuring that valve 89 will be maintained in its normal position, in which it is shown, for maintaining pipe 9 connected via cavity 93 to the brake pipe 10 to assure that the brake pipe will be vented past the emergency valve 58 in the manner above described.

Assume now that with the brake valve handle 51 in either fast release position, slow release position, service position, or in some other position within the application zone, the safety control pipe 85 is vented, such as due to failure of the operator to maintain the pedal 98 of foot valve device 97 depressed. Since in these positions of handle 51 the permanent suppression pipe 12 and hence passage 99 is lapped (Fig. 3), it is apparent that upon venting of pipe 85, the double check valve device 13 will operate to correspondingly vent chamber 88 of application valve device 11. Under this condition, pressure in pipe 9, as noted in chamber 87, will shift the piston 86 against resistance of spring 92 to an application position, in which a valve 94 is unseated against resistance of spring 96, for thereby maintaining chamber 88 vented via the then vented lockover passage 108 (see Fig. 3), even if the pipe 85 is subsequently recharged. Also, with piston 86 and hence the valve 89 in application position, pipe 9 is disconnected from brake pipe 10 via cavity 93 and said brake pipe is uncovered to the service exhaust choke 91, for venting the brake pipe at a service rate. This service rate of reduction in brake pipe pressure will effect a safety control application of brakes throughout the train.

To recapture control of brakes, the operator must move the brake valve handle 51 either to suppression position or emergency position for effecting either a full service or emergency application of brakes, respectively. In these positions, the lockover passage 108 will be lapped by the suppression control valve 52, and main reservoir fluid will be supplied via opening 113 in said valve to permanent suppression passage 99 and pipe 12 and thence via double check valve device 13 to chamber 88 of application valve device 11, for shifting piston 86 and thereby valve 89 to normal position, in which they are shown, and in which communication is reestablished between pipe 9 and brake pipe 10, and valve 94 is reseated by spring 96. Thereafter, the brake valve handle 51 may be moved to fast release position or slow release postion for effecting a release of brakes.

*Description and operation—Fig. 2*

As shown in this figure, the brake valve device embodying the invention is identical with that shown in Fig. 1 except for certain modifications or replacement of parts (hereinafter described), as necessary to condition said device to control brakes on the locomotive and connected cars on the electro-pneumatic straight air principle. Hence, like reference numerals will be used to designate structure shown in Fig. 2 which is identical with that shown and already described in connection with Fig. 1, and only structure which differs from that shown in Fig. 1 will now be described.

The cam 49 shown in Fig. 1 is replaced by a cam 115 of different configuration having its lowest point in engagement with the follower 47 when the brake valve handle 51 is in fast and slow release positions and its highest point in engagement with said follower in emergency position (see Fig. 4). The screw 39 is backed partially out of the casing to reduce the degree of preloading of spring 37 to an extent for providing a maximum pressure in chamber 36 of a chosen value, such as 24 p.s.i. (Fig. 4), during an emergency application of brakes. The permanent suppression pipe 12 and lockover pipe 14 shown in Fig. 1 are disconnected from pipe bracket 8, and plugs 116 and 117 are inserted in said bracket to plug the passages 99 and 108, respectively. A branch of the usual straight air pipe 118, that extends through the train, is connected to the pipe bracket 8 in lieu of the pipe 9 shown in Fig. 1. An electro-pneumatic switch pipe 119 is connected to the pipe bracket 8 for connecting a branch of passage 109 (shown plugged in Fig. 1) to an electro-pneumatic switch 120; and an application pipe 121, which may be a branch of a normally charged train line, such as the brake pipe, is connected to said pipe bracket. The double check valve device 13, application valve device 11 and foot valve device 97, shown in Fig. 1, are eliminated. The quick release valve device 6 shown in Fig. 1 is replaced by a plug 122, and the valve device 7 is replaced by a cap nut having a restricted service port 123 such that the passage 82 is now in constant communication via said port with passage 79 leading to chamber 18 of relay valve device 2.

The emergency or vent valve device 5 shown in Fig. 1 is replaced, such as by replacement of a suitable bushing (not shown), by an emergency valve device 124. This valve device 124 comprises, briefly, a pusher stem 125 adapted, through the medium of cam 66 when brake valve handle 51 is in emergency position, to engage a fluted stem 126 of an emergency valve 127 for operatively unseating said valve against resistance of a spring 128 contained in a chamber 129 constantly open via a passage 130 to the application pipe 121, for venting fluid under pressure from pipe 121 via chamber 129 and along said fluted stem to an atmospheric chamber 131.

In operation, assume that the brake valve handle 51 is in slow release position (Fig. 4), and that the main reservoir 16 and application pipe 121 are charged with fluid under pressure. Under this condition, the various components of the brake valve device will assume the respective positions in which they are shown in Fig. 2. More specifically, the chamber 36 of control valve device 3 and also control chamber 18 of relay valve device 2 will be vented to atmosphere via branches of passage 82, port 104, cavities 103 and 110 and exhaust opening 111 in valve device 3; and with chamber 18 thus vented, the relay valve device 2 will have operated to vent chamber 19 and also the straight air pipe 118, in a manner similar to that described in connection with Fig. 1.

To effect a pneumatic straight air service application of brakes, the brake valve handle 51 is moved into the application zone (Fig. 4) a degree corresponding to the degree of straight air service application desired, for thereby causing cam 115 through the medium of follower 47 to shift the main slide valve 41 leftward relative to the then stationary auxiliary slide valve 45. During this leftward movement of valve 41, the vent cavity 110 will be successively cut off from cavity 103 in valve 45 and then the supply port 102 will be brought into registry with cavity 103. Fluid under pressure will thereupon be supplied from main reservoir 16 via passage 54, strainer 100, passage 101, port 102, cavity 103 and port 104 to passage 82, whence such fluid will flow via baffle choke 106 to chamber 36 of valve device 3 and also via service choke 123 to chamber 18 of relay valve device 2.

By the time pressure in chamber 36 has increased to a value corresponding to the shifted position of valve 41, as determined by degree of thrust imposed by cam 115 thereon, the piston 35 will have been shifted leftward against resistance of spring 37 a distance sufficient to permit spring 46 to shift the auxiliary slide valve 45 leftward (relative to the then stationary main valve 41) a corresponding distance for thereby carrying the cavity 103 out of registry with port 102 and thereby bottling up fluid in the passage 82 and hence in chamber 18 of relay valve device 2 at a pressure corresponding to the position of handle 51 in the application zone.

Meanwhile, the piston 17 of relay valve device 2 will be shifted rightward by pressure of fluid in control chamber 18 for operatively unseating supply valve 23 through the medium of stem 20. With supply valve 23 unseated, main reservoir fluid will be supplied via passage 54 and chamber 32 past unseated valve 23 to chamber 25 whence it will flow via passage 33 to the straight air pipe 118 for causing brakes to be applied to a degree corresponding to the pressure of fluid in said pipe, in the well-known manner. Thus, the relay valve device 2 will operate to provide in the straight air pipe fluid at a pressure corresponding to the control pressure in chamber 18, which latter pressure is controlled by operation of the control valve device 3.

If a straight air full service application of brakes is desired, the brake valve handle 51 is moved to service position (Fig. 4). In this position, the cam 115 will so position the valve 41 as to cause the control valve device 3 to operate to provide a maximum service pressure, of such as 16 p.s.i., in the control chamber 18 of relay valve device 2, for thereby causing the latter device to operate to provide a corresponding pressure of the illustrative 16 p.s.i. in the straight air pipe 118.

If the brake valve handle 51 is moved to suppression position (Fig. 4), cam 115 will be so positioned as to cause the control valve device 3 and relay valve device 2 to provide a straight air pipe pressure equivalent to that obtained in service position; and although the suppression valve 52 will be shifted by cam 56 to its suppression position (Fig. 4), in which main reservoir fluid is supplied via opening 113 to passage 99, such operation of valve 52 will be of no consequence in view of the plug 116. If it is desired, however, to employ a safety control (or train control) feature, the pipe 9 of Fig. 1 could be connected to the pipe bracket 8 so as to communicate with passage 130 and the brake pipe 10 of Fig. 1 used in lieu of pipe 121, in which case the application valve device 11, foot valve device 97 and double check valve device 13 could be interconnected in the same manner as shown in Fig. 1, with plugs 116 and 117 being removed as shown in the latter figure; under this condition, movement of the handle 51 to suppression position (Fig. 4) would effect suppression of a safety control (or train control) application of brakes in the same manner as described in connection with Fig. 1.

To effect an emergency application of brakes, the brake valve handle 51 is moved to emergency position (Fig. 4), in which the cam 66 through the medium of stem 125 operatively unseats the emergency valve 127 against resistance of spring 128 for releasing fluid under pressure from the application pipe 121 to atmospheric chamber 131 at an emergency rate. The brake controlling valve devices (not shown) on the locomotive and cars will respond to venting of pipe 121 at an emergency rate to effect an emergency application of brakes in the well-known manner.

To effect a graduated release of a service application of brakes, the brake valve handle 51 is moved through the application zone toward slow release position a degree corresponding to the degree of release desired. During this movement, the thrust imposed by cam 115 will be correspondingly reduced, causing spring 46 through the medium of follower 47 to shift the valve 41 rightward relative to the valve 45, which is then held stationary and in contact with piston 35 by pressure of spring 46. Under this condition, fluid under pressure will be released from chamber 36 of control valve device 3 and chamber 18 of relay valve device 2 to atmosphere via branches of passage 82, port 104, cavities 103 and 110, opening 111 and atmospheric chamber 43. By the time pressure in chamber 36 has reduced to a value corresponding to the degree of brake application desired to be retained, the piston 35 under action of spring 37 will have shifted the valve 45 relative to the then stationary valve 41 to a position in which cavity 103 is out of registry with cavity 110; whereupon fluid will be bottled up in the chambers 36 and 18 at said value.

Meanwhile, the relay valve device 2 will respond to the reduction in pressure in chamber 18 to effect a corresponding reduction in pressure in chamber 25 and hence in the straight air pipe 118.

On the other hand, if a fast direct release of a service or emergency brake application is desired, the brake valve handle 51 is moved directly to a fast release position (Fig. 4), in which cam 56 will be at its low point for causing spring 55 to shift suppression valve 52 rightward to a position in which main reservoir fluid will flow via opening 113 to passage 109 and thence via pipe 119 to electro-pneumatic switch 120. This switch 120 may be of any suitable type comprising means (not shown) normally biased to a position for disestablishing an electrical connection between a release train wire 132 and a return train wire 133 and operative when pressure fluid is supplied thereto via the pipe 119 to establish said electrical connection for energizing said release wire 132 and thereby effecting operation of release magnet valve devices (not shown) on the brake controlling valves of the locomotive and cars of a train for electro-pneumatically effecting a full direct release of brake application through the train. A brake controlling valve embodying such release magnet valve devices may be of the type disclosed in the copending application of George L. Cotter and William B. Jeffrey, U.S. Serial No. 556,308, filed December 29, 1955, and assigned to the assignee of the present invention. After the fast direct release has thus been effected, the brake valve handle 51 should be moved to slow release position to permit recharging of the control reservoirs (not shown) associated with these brake controlling valves, as will be more fully understood from a study of this last-mentioned copending application.

It will be understood that the branch of passage 109 leading to pipe 119 could be plugged and the electro-pneumatic switch 120 eliminated, and the quick release valve device 6 of Fig. 1 installed in lieu of the plug 122, if it is desired to effect fast direct release of brakes on the locomotive and cars pneumatically, as explained in connection with Fig. 1, instead of electro-pneumatically. Under this condition, the quick release valve device 6 would cooperate with restricted port 123 to provide rapid release of control pressure from the relay valve chamber 18, whenever the communication 82, 69, 70, 71 (Fig. 1) is opened by operation of suppression control valve 52 responsively to movement of brake valve handle 51 to fast release position.

Summary

It will now be seen that I have provided an improved, relatively inexpensive self-lapping brake valve device which may be conditioned to provide either automatic or straight air control of brakes on a locomotive and connected cars of a train.

More specifically, and according to features of the invention, this brake valve device comprises a handle 51 rotatable to a plurality of positions for controlling rotative position of a stem 50 which carries three spaced cams. One of these cams 49 (or 115, in Fig. 2) controls operation of a self-lapping control valve device 3; another cam 56 controls operation of a suppression control valve device 4; and the third cam 66 controls operation of an emergency or vent valve device 5 (or 124, in Fig. 2). The device 3 embodies means 39 for adjusting a spring 37 to preload a diaphragm piston 35 to a desired degree corresponding to a maximum selected control pressure obtainable in a control chamber 18 of a relay valve device 2, which latter device operates to provide in a brake pipe 10 (or in the straight air pipe 118 of Fig. 2) fluid at a pressure corresponding to said control pressure for thereby causing brakes to be controlled accordingly.

The brake valve device, when conditioned for automatic operation (Figs. 1, 3) preferably comprises a quick release valve device 6 which controls an equalizing reservoir charging communication (82, 69, 70, 71) which is normally closed but which is opened responsively to supply of main reservoir fluid to a passage 109 by operation of the suppression control valve device 4 responsively to movement of the brake valve handle 51 to a fast release position. With this communication opened, fluid under pressure is supplied from the main reservoir 16 to the equalizing reservoir 15 at a relatively rapid rate corresponding to the combined flow capacities of said communication and of a parallel arranged slow charge communication (82, 72, 80, 71).

The relay valve device 2 will respond to this rapid rate of increase in equalizing reservoir pressure, as noted in the control chamber 18, to effect a correspondingly rapid rate of increase in brake pipe pressure for thereby causing a brake controlling valve, such as of the type disclosed in the aforementioned copending application of Wilson and Worbois to operate to effect a full, direct release of brakes. On the other hand, if the brake valve handle 51 is moved toward or to a slow release position (Fig. 3) charging of the equalizing reservoir 15 will be at the slower rate controlled solely by the flow capacity through restricted port 80, for controlling recharging of the equalizing reservoir 15 at a slower rate and within small pressure increments and thereby permitting graduated release of an automatic brake application through the relay operation of relay valve device 2.

The suppression control valve device 4 not only controls supply of main reservoir fluid via passage 109 to the quick release valve device 6 (Fig. 1) or to the electro-pneumatic switch 120 (Fig. 2) but also controls supply of fluid under pressure to and venting of a suppression passage 99 and a lockover passage 108. The device 4 is adapted to provide permanent suppression (while the brake valve handle 51 is in suppression position or emergency position) of an automatic safety control (or train control) application of brakes.

Having now described the invention, what I claim as new and desire to secure by Letters Patent, is:

1. In a brake valve device, of the type having a chamber in which pressure of fluid is varied for controlling application and release of brakes, the combination of a self-lapping control valve unit comprising bias means for providing a preselected bias corresponding to a desired maximum fluid pressure in said chamber, movable abutment means subject opposingly to pressure of fluid in said chamber and to pressure of said bias means, two valve members telescopingly arranged and each movable independently of and relatively to each other, means including said movable abutment means for controlling positioning of one of said valve members, and operator-controlled means for controlling positioning solely of the other of said valve members; said operator-controlled means being movable in one direction within an application zone to cause operation of said valve members for supplying fluid to said chamber at a pressure corresponding to the extent of such movement, said operator-controlled means being movable in the opposite direction within said zone to cause operation of said valve members for releasing fluid from said chamber a desired degree corresponding to the extent of such opposite movement and then bottling up fluid in said chamber at such desired reduced pressure.

2. In a brake valve device of the type comprising a chamber in which the pressure of fluid is varied to control application and release of brakes, the combination of operator-controlled cam means; and a self-lapping control valve unit comprising a movable abutment subject to a preselected bias opposing pressure of fluid in said chamber, two valves each telescopingly movable relative to the other, means for biasing one of said valves in one direction into operative engagement with the side of said movable abutment adjacent said chamber, and means for biasing the other of said valves in the opposite direction into operative engagement with said operator-controlled cam means, said valves being cooperative to provide in said chamber fluid at a pressure corresponding to positioning of said operator-controlled cam means.

3. In a brake valve device of the type comprising a chamber in which the pressure of fluid is varied for controlling application and release of brakes, the combination of operator-controlled cam means, a self-lapping control valve unit comprising bias means, a movable abutment subject to pressure of said bias means opposing pressure of fluid in said chamber, two valves each longitudinally movable independently of and relative to the other, spring means for biasing one of said valves in one direction into operative engagement with the side of said movable abutment exposed to fluid pressure in said chamber such that positioning of said one valve will be controlled solely according to positioning of said movable abutment, and spring means for biasing the other of said valves in the opposite direction into operative engagement with said cam means such that positioning of said other valve will be controlled solely according to positioning of said cam means, said valves being cooperative to provide in said chamber fluid at a pressure corresponding to the position of said cam means.

4. In a fluid pressure brake apparatus of the type having a chamber in which the pressure of fluid is varied for controlling application and release of brakes, the combination of a brake valve device comprising handle means, cam means operably rotatable by said handle means, and self-lapping control valve means comprising a movable abutment subject at one side to a spring bias and at the opposite side to chamber pressure, two slide valves telescopingly movable relative to each other, and spring means interposed between said slide valves for biasing one of said slide valves into operative engagement with said opposite side of said movable abutment and biasing the other of said slide valves into operative engagement with said cam means, said control valve means being responsive to movement of said handle means to a release position to effect supply of fluid under pressure to said chamber and responsive to subsequent movement of said handle means into an application zone to release fluid under pressure from said chamber to a degree corresponding to the setting of said handle means in said zone, said control valve means being responsive to subsequent movement of said handle means from said setting toward release position to another setting in said zone to effect recharging of said chamber to a degree corresponding to said other setting for causing a graduated release of brakes.

5. In a brake valve device of the type having a chamber in which pressure of fluid is varied for controlling application and release of brakes, the combination of and operating handle, a plurality of cams operably rotatable by said handle; self-lapping control valve means comprising bias means for providing a preselected bias corresponding to a desired maximum fluid pressure in said chamber, a movable abutment subject opposingly to pressure of fluid in said chamber and to pressure of said bias means, two valves each movable slidingly relative to and independently of the other, means for urging one of said valves into operative engagement with one of said cams, means for urging the other of said valves into operative engagement with the side of said movable abutment adjacent said chamber, said valves being conditioned by said one cam responsively to movement of said handle within an application zone to provide in said chamber fluid at a pressure corresponding to the setting of said handle in said zone and to movement of said handle to a position beyond said zone to provide in said chamber fluid at a pressure which will cause a full service application of brakes; a permanent suppression passage normally devoid of fluid under pressure for permitting a safety control application of brakes and to which fluid under pressure is supplied for causing suppression of a safety control application of brakes; and suppression control valve means controlled by another of said cams and operative when said handle is within said zone to vent said suppression passage and responsive to movement of said handle to the aforesaid position to supply fluid under pressure to said suppression passage.

6. In a fluid pressure brake apparatus, the combination of a normally charged equalizing reservoir in which pressure of fluid is reduced for causing an automatic application of brakes and in which fluid pressure is increased for causing a release of said automatic application, an operating handle normally in a slow release position, a plurality of spaced cams operable by said handle, self-lapping control valve means comprising a movable abutment subject to a preselected bias opposing equalizing reservoir pressure, two valves longitudinally movable relative to each other, means for biasing one of said valves in one direction into operative engagement with the side of said movable abutment exposed to equalizing reservoir pressure, means for biasing the other of said valves in the opposite direction into operative engagement with one of said cams, two parallel arranged restricted communications through which fluid under pressure may be conveyed from said control valve means to said equalizing reservoir, quick release valve means for selectively opening or closing one of said communications according to whether a passageway is charged with fluid under pressure or is vented, means defining a permanent suppression passage to which fluid under pressure may be supplied for causing suppression of a safety control application of brakes, and suppression valve means controlled by another of said cams and operative while said handle is in slow release position and in an application zone and in a suppression position to vent said passageway and while said handle is in a fast release position to charge said passageway, said suppression valve means being operative while said handle is in slow release position and fast release position and in the application zone to prevent supply of fluid under pressure to said suppression passage and while said handle is in suppression position to charge said suppression passage, said control valve means being operative responsively to movement of said handle from slow release position into said application zone to effect a reduction in equalizing reservoir pressure of a degree corresponding to the extent of such handle movement, and operative responsively to movement of said handle to suppression position to effect a full service reduction in equalizing reservoir pressure, and operative responsively to subsequent movement of said handle toward slow release position to effect recharging of said equalizing reservoir via and at the relatively slow rate controlled by the other of said communications to a degree corresponding to the extent of such subsequentl movement for effecting a graduated release of brakes, said control valve means being operative responsively to movement of said handle selectively to slow release position and fast release position to effect recharging of said equalizing reservoir to its normal charge value, whereby in fast release position the equalizing reservoir will be recharged at a relatively fast rate corresponding to the combined flow capacities of said two restricted communications.

7. In a fluid pressure brake apparatus of the type having a chamber which is charged with fluid under pressure for causing a brake application and vented for causing a brake release, the combination of a release train wire, a return train wire, electro-pneumatic switch means operative by fluid under pressure to effect energization of said release wire for causing a fast direct release of brakes, operator-controlled means comprising a plurality of cams and having a plurality of positions including a fast release position and a slow release position, a self-lapping control valve unit comprising bias means for imposing a preselected bias corresponding to a desired maximum pressure obtainable in said chamber, a movable abutment subject to pressure of said bias means opposing fluid pressure in said chamber, two valves movable longitudinally relative to and in contact with each other, means for biasing one of said valves in one direction into operative engagement with the side of said movable abutment exposed to pressure in said chamber, means for biasing the other of said valves into operative engagement with one of the cams of said operator-controlled means, said valves being cooperative to provide in said chamber fluid at a pressure corresponding to positioning of said one cam and operative in both fast and slow release positions of said operator-controlled means to completely vent said chamber, and valve means controlled by another of said cams of said operator-controlled means and effective to supply fluid under pressure to or vent said switch means according as said operator-controlled means is in fast release position or slow release position, respectively.

8. In a fluid pressure brake apparatus of the type comprising a brake pipe, an equalizing reservoir, a passageway normally open to said brake pipe, and relay valve means operative to provide in said passageway fluid at the pressure of fluid in said reservoir, the combination of a lockover pipe, application valve means having a normally charged chamber and responsive to venting of said chamber to disconnect said brake pipe from said passageway and connect the brake pipe to atmosphere and also open said lockover pipe to said chamber, means defining a first conduit and a second conduit, double check valve means for connecting to said chamber whichever one of said conduits is charged with fluid at the higher pressure, safety control valve means normally conditioned to supply fluid under pressure to said first conduit and operative under a certain safety control condition to vent said first conduit for causing a safety control application of brakes, an operating handle, a plurality of cams operably connected to said handle, a self-lapping control valve unit comprising bias means, a movable abutment subject to pressure of said bias means opposing equalizing reservoir pressure, two valves each movable longitudinally relative to and independently of the other, means for biasing one of said valves in one direction into operative engagement with the side of said movable abutment exposed to equalizing reservoir pressure, means for biasing the other of said valves in the opposite direction into operative engagement with one of said cams, said valves being cooperative responsively to movement of said handle to a release position to charge the equalizing reservoir to a normal charge value, and responsive to movement of said handle to a suppression position to effect a full service reduction in equalizing reservoir pressure, and suppression control valve means controlled by another of said cams for normally venting said lockover pipe and preventing supply of fluid under pressure to said second conduit and responsive to movement of said handle to suppression position to supply fluid under pressure to said second conduit for suppressing a safety control brake application despite the occurrence of said certain condition and also lap off said lockover pipe for permitting effective recharging of said chamber.

9. In a fluid pressure brake apparatus, a self-lapping control valve unit for controlling the pressure of fluid in a chamber in which the pressure of fluid is varied for controlling application and release of brakes, said unit comprising spring means for providing a preselected bias corresponding to a desired maximum pressure in said chamber, movable abutment means subject opposingly to pressure of fluid in said chamber and to pressure of said spring means, two telescopingly arranged valve members each movable independently of and relatively to the other for controlling supply of fluid under pressure to and release of fluid under pressure from said chamber, and means operably connecting one of said valve members to said movable abutment means such that longitudinal positioning of said one valve member will be controlled exclusively according to positioning of said movable abutment means, the other of said valve members being longitudinally positioned solely under the manual control of an operator, said valve members being cooperative to so control pressure of fluid in said chamber as to provide therein fluid at a pressure corresponding to longitudinal positioning of said one valve member.

10. In a fluid pressure brake apparatus, a self-lapping control valve unit comprising a casing having a fluid pressure supply passage and a fluid pressure delivery passage each opening through the wall of a valve bore, bias means, a movable abutment subject to pressure of said bias means opposing pressure of fluid in a chamber open to said delivery passage, two telescopingly arranged valve members each movable independently of and relatively to the other, the outer of said valve members being reciprocable within said valve bore and having a supply port and a delivery port each extending radially therethrough and registerable with said supply and delivery passages, respectively, said outer valve member also having a cavity in its inner wall, the inner of said valve members having an elongated cavity and a vent opening, one of said valve members being longitudinally positioned under manual control of an operator, and the other of said valve members being longitudinally positioned by said movable abutment, such that said elongated cavity will establish connection of said supply port with said delivery port or first-named cavity, and said first-named cavity will be connected or disconnected from said vent opening according to relative positioning of said valve members for thereby providing in said delivery passage fluid at a pressure corresponding to the operator-controlled position of said one valve member.

References Cited in the file of this patent

UNITED STATES PATENTS

| | | |
|---|---|---|
| 1,849,702 | Bard | Mar. 15, 1932 |
| 2,037,978 | Hansen | Apr. 21, 1936 |
| 2,042,112 | Lynn et al. | May 26, 1936 |
| 2,084,675 | Farmer | June 22, 1937 |
| 2,232,467 | Morin et al. | Feb. 18, 1941 |